Aug. 18, 1959  R. B. SQUIRES ET AL  2,900,605
ELECTRICAL MEASURING SYSTEM
Filed May 20, 1955
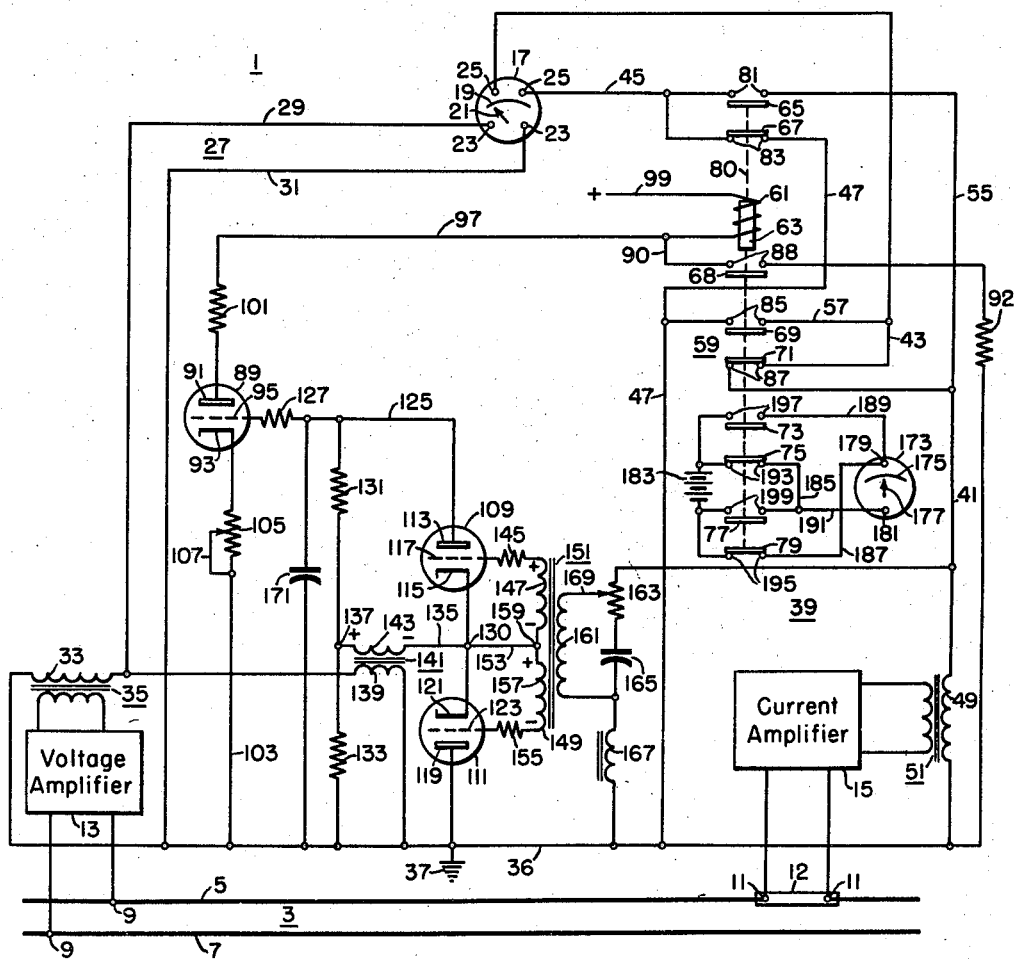
WITNESSES
Robert C Baird
David M. Schiller
INVENTORS
Rathbun B. Squires
and Dale O. Ballinger.
BY C. L. Freedman
ATTORNEY United States Patent Office 2,900,605
Patented Aug. 18, 1959

2,900,605

ELECTRICAL MEASURING SYSTEM

Rathbun B. Squires, Forest Hills, Pa., and Dale O. Ballinger, Lakewood, Colo., assignors to Westinghouse Electric Corporation, East Pittsburgh, Pa., a corporation of Pennsylvania Application May 20, 1955, Serial No. 509,854

4 Claims. (Cl. 324—142)

This invention relates to electrical measuring systems and has particular relation to systems for measuring the power of alternating current circuits.

Electrical instruments have previously been provided which produce a response representative of a product function of two energizing alternating quantities. As an example, instruments have been employed to produce a response representative of power of alternating current circuits. Such instruments have taken a variety of forms.

Instruments of the indicating type have been constructed which include an indicating pointer arranged to traverse a suitably calibrated scale in response to energization of the instrument. Such indicating instruments are either of the center-zero type or the end-zero type. Instruments of the center-zero type include a calibrated scale having a zero marking at the center of the scale. These instruments provide an indication which is representative of both the magnitude and the direction of power of an alternating current circuit.

Instruments of the end-zero type include a calibrated scale having a zero marking at one end of the scale. Such instruments provide an indication of the magnitude of power having but a single direction in an alternating current circuit. In order to permit an indication of the magnitude of power for either direction of power instruments of the end-zero type are generally provided with manually actuable means effective when actuated to change the connections of the energizing circuit to the instrument to thereby permit an indication of the magnitude of power for either direction of power.

In certain electrical circuits both the magnitude and direction of power are subject to frequent variation. In the past, the measurement of the magnitude of power of such circuits has been particularly troublesome. This is especially true when it is desired to effect a considerable number of accurate and rapid measurements of power of such circuits.

In such circuits, instruments of both the center-zero and end-zero type have been employed. Although the end-zero instruments generally permit an accurate reading by reason of the relatively long scale thereof, the operator is required to effect frequent actuation of the associated manually actuable means to permit readings of power of different directions. This is a cumbersome and tiresome procedure. When instruments of the center-zero type are utilized, the operator is relieved of the necessity of effecting frequent actuation of the associated manually actuable means to permit readings of power of different directions. However, by reason of the center-zero marking of such instruments, the effective scale length is generally insufficient to permit accurate reading of such instruments.

In accordance with the present invention, a power measuring system is provided which includes an indicating instrument of the end-zero type with means for automatically reversing the connections of the energizing circuits to the instrument in response to a reversal of the direction of the power under measurement. The invention thereby permits accurate reading of the magnitude of power for either direction of power without the necessity of frequent manual actuation of manually actuable means.

The invention further provides indicating means which are controlled by the automatic means for providing an indication of the direction of power under measurement. Such indicating means is conveniently positioned at a location remote from the power magnitude measuring device.

According to a specific embodiment of the invention, the measuring system includes an indicating instrument having a pair of input terminal means with a pair of paths for current energizing one of the terminal means. The paths are arranged to provide opposing instantaneous polarities of energization of the associated terminal means relative to each other.

Suitable switch means are provided having two operating positions each effective to establish a separate one of the paths. The switch means are controlled by suitable electronic control means effective in response to a reversal of the direction of power to actuate the switch means from one operating position to the other operating position.

Additional switch means are associated with the remote indicating means for actuation by the electronic control means. The remote indicating means may comprise any suitable indicating device. In the specific embodiment of the invention the indicating means is in the form of an electrical indicating instrument of the center-zero type connected to provide an indication of the direction of power.

It is, therefore, an object of the invention to provide an improved electrical measuring system.

It is another object of the invention to provide a power measuring system including an indicating instrument of the end-zero type with improved means for permitting a reading of the magnitude of power of an alternating current circuit for either polarity of power.

It is a further object of the invention to provide a power measuring system including an electrical instrument having a pair of input terminal means with means for automatically reversing the energizing circuit connections to one of the terminal means in response to a reversal of the direction of power of an alternating current circuit.

It is a still further object of the invention to provide a power measuring system including means effective to provide separate indications of the magnitude and the direction of power of an alternating current circuit.

Other objects of the invention will become apparent from the following description taken in conjunction with the accompanying drawing, in which:

The figure is a circuit diagram in schematic form of an electrical measuring system embodying the invention.

Referring to the drawing, there is illustrated in the figure an electrical measuring system represented generally by the numeral 1 embodying the teachings of the invention. As shown in the drawing, the system 1 is connected for energization from an alternating current circuit 3 represented by the parallel conductors 5 and 7. It will be assumed that the circuit 3 is operating at a frequency of sixty cycles per second.

The system 1 is adapted to produce when energized a response representative of a product function of voltage and current of the circuit 3. In the specific embodiment of the invention illustrated, the system 1 is effective to produce a response representative of real power of the circuit 3.

As illustrated, the system 1 includes a pair of voltage terminals 9 each connected to a separate one of the conductors 5 and 7 for energization in accordance with voltage of the circuit 3. The system 1 is also provided with a pair of current terminals 11 shown connected to the conductor 5 through a suitable shunt device 12 for energization in accordance with current of the circuit 3. Suitable amplifying means represented diagrammatically by the blocks 13 and 15 may be provided to produce amplified output quantities representative of voltage and current respectively of the circuit 3.

In order to provide a response representative of power of the circuit 3, a suitable electroresponsive instrument 17 is included in the system 1. The instrument 17 may be of any suitable type. Preferably, the instrument 17 is of the indicating type having a suitably calibrated scale 19 and an indicating pointer 21 adapted to traverse the scale 19 in response to energization of the instrument 17. As will presently appear, the scale 19 is preferably calibrated with an end-zero marking to provide an effective scale length sufficient to permit accurate reading of the instrument 17. As shown, the instrument 17 is in a de-energized condition with the pointer 21 assuming a position at a zero marking of the scale 19 at the left end of the scale.

In order to permit energization of the instrument 17 in accordance with voltage and current of the circuit 3, two pairs of input terminals 23 and 25 are provided for the instrument 17. Each pair of terminals is connected for energization in accordance with a separate one of the voltage and current quantities of the circuit 3.

In order to connect the terminals 23 for energization in accordance with voltage of the circuit 3, an energizing circuit 27 is provided which includes a pair of conductors 29 and 31. The conductors 29 and 31 are shown connected to the terminals 23 for energization in accordance with the output quantity produced by the amplifier 13. To this end, the conductor 29 is connected between one of the terminals 23 and one side of a secondary winding 33 of an output transformer 35 of the amplifier 13. The conductor 31 is connected between the other of the terminals 23 and the other side of the winding 33 through a portion of a conductor 36 which is maintained at ground potential by a ground connection 37. In certain installations the amplifier 13 may be omitted and the conductors 29 and 31 connected directly to the conductors 5 and 7 of the circuit 3.

The terminals 25 are connected for energization from the amplifier 15 by means of a circuit 39 which includes conductors 41, 43, 45 and 47. As shown, the conductors 41 and 43 are connected between one of the terminals 25 and one side of a secondary winding 49 of an output transformer 51 of the amplifier 15. The conductors 45 and 47 are connected between the other of the terminals 25 and the other side of the winding 49 through a portion of the grounded conductor 36. With such connections, the instrument 17 will produce an indication of the real power of the circuit 3. In certain installations the amplifier 15 may be omitted and the conductors 41 and 47 connected directly to one of the conductors 5 and 7 of the circuit 3 through a suitable shunt device.

As understood in the art, the direction of power in an alternating current circuit is dependent upon the phase relationship between voltage and current of the circuit. For purposes of discussion, it will be assumed that power of the circuit 3 has a positive direction for a phase displacement between voltage and current of the circuit 3 within the range of 0° to 90°, and a negative direction for a phase displacement of voltage and current within the range of 90° to 180°.

In certain installations, both the magnitude and the direction of power are subject to frequent changes by reason of variations in the magnitudes of voltage and current and the phase relationship therebetween. For such installations, it may be desired to effect a number of rapid and accurate measurements of power. In the past, indicating instruments of both the end-zero and center-zero type have been utilized for this purpose. Instruments of the end-zero type permit more accurate readings than instruments of the center-zero type by reason of the longer effective scale length thereof. However, such end-zero instruments permit the measurement of power only for a single direction of such power. In order to permit power measurements for either direction of power instruments of the end-zero type are generally provided with manually actuable means effective when actuated to reverse energizing circuit connections to such instruments. Where a number of rapid readings are required, frequent actuation of such manually actuable means may tend to impair the reading efficiency of an operator.

In accordance with the invention, means are provided for automatically reversing the energizing circuit connections to the instrument 17 in response to a reversal of the direction of power of the circuit 3. In order to permit the reversal of such connections, one or both of the pairs of terminals 23 and 25 are connected for energization through a pair of paths for energizing current. The paths are connected to provide opposing instantaneous polarities of energization of the associated terminals relative to each other.

In the specific embodiment of the invention illustrated, the current terminals 25 are connected for energization through a pair of paths from the amplifier 15. A first one of these paths comprises the conductors 41, 43, 45 and 47 whereas the second path comprises conductors 41, 55, 45, a portion of conductor 43, conductor 57 and a portion of conductor 47. It is observed that the conductor 55 extends between the conductors 41 and 45 and that the conductor 57 extends between the conductors 43 and 47. With this arrangement, current having a given instantaneous polarity at one side of the winding 49 flows through the terminals 25 in opposing directions in the two paths.

In order to control the path of energization of the terminals 25 to thereby control the instantaneous polarity of energization of such terminals, suitable switch means represented generally by the numeral 59 are provided for interrupting and establishing such paths. In the specific embodiment illustrated, the switch means 59 is in the form of an electromagnetic relay having an energizing winding 61 for actuating a magnetic plunger 63. The plunger 63 is mechanically connected to a plurality of contact bars 65, 67, 68, 69, 71, 73, 75, 77 and 79 as indicated by the dotted line 80. With this arrangement, movement of the plunger 63 effects simultaneous corresponding movement of the several contact bars to circuit establishing or interrupting positions as determined by the energization of the winding 61. The contact bars 73, 75, 77 and 79 control additional energizing circuits described hereinafter.

As illustrated in the drawing, the contact bar 65 is adapted to control current flow through a pair of spaced terminals 81 of the conductor 55 of the second energizing current path. The contact bar 67 is adapted to control current flow through a pair of spaced terminals 83 of the conductor 47 which is a part of the first path for energizing current. In a similar manner, the contact bar 69 controls current flow through spaced terminals 85 of the conductor 57 of the second path and the contact bar 71 controls current flow through spaced terminals 87 of the conductor 43 included in the first path. The contact bar 68 is arranged to control current flow through spaced terminals 88 of a conductor 90 connected between the conductors 97 and 36 for a purpose appearing hereinafter. A current limiting resistor 92 is connected in the conductor 90. The operation and effect of the switch means 59 will now be described.

The switch means 59 has two operating positions each one of which is effective to establish a separate one of the energizing paths. One position occurs with the winding 61 in an energized condition whereas the other position occurs with the winding 61 in a deenergized condition. As shown in the drawing, the winding 61 is in a deenergized condition which is effective for establishing the first path comprising conductors 41, 43, 45 and 47. To this end, the contact bars 67 and 71 are positioned to engage the terminals 83 and 87 whereas the contact bars 65 and 69 are positioned to disengage the terminals 81 and 85.

Let it be assumed that voltage across the winding 49 is of such polarity that the upper side of the winding 49 as viewed in the drawing is of positive instantaneous polarity. Then, with the winding 61 in a deenergized condition as shown, the direction of current flow may be traced from the upper side of the winding 49 through conductor 41, contact bar 71, the terminals 25, conductor 45, and contact bar 67 back to winding 49 through conductor 47 and a portion of conductor 36.

Let it now be assumed that the winding 61 is in an energized position to actuate the several contact bars to positions opposite from positions shown in the drawing. Then, the direction of current flow can be traced from the upper side of the winding 49, through conductor 41, conductor 55, the contact bar 65, the terminals 25, a portion of the conductor 43, the contact bar 69 and back to the winding 49 through a portion of the conductor 47. Consequently, it is observed that the instantaneous polarity of energization of the terminals 25 is dependent upon which of the two energizing paths is established by the switch means 59.

In order to control the operation of the switch means 59, the invention provides control means arranged to maintain one path of energization of the terminals 25 for a predetermined direction of power of the circuit 3. Such control means are further effective in response to a reversal of the direction of power of the circuit 3 to actuate the switch means 59 from one path establishing position to the other path establishing position.

In the specific embodiment of the invention illustrated, such control means includes an electrical discharge device 89 of the three-electrode type having an anode 91, a cathode 93 and a grid electrode 95. The anode 91 is connected to one end of the winding 61 through a conductor 97. The other end of the winding 61 is connected to a conductor 99 which is maintained at a positive potential relative to the grounded conductor 36. A resistance 101 is provided in the conductor 97 to limit current flowing from the device 89 to the winding 61. With this arrangement, energization of the winding 61 is controlled by the device 89 with the winding 61 being in an energized condition when the device 89 is in a conducting condition. The conducting state of the device 89 is controlled in accordance with the biasing of the electrode 95.

As shown, the cathode 93 of the device 89 is connected to the conductor 36 through a conductor 103 and a suitable resistance 105 included in the conductor 103. When the device 89 is in a conducting condition, current flow through the conductor 103 will produce a voltage drop across the resistance 105. An adjustable arm 107 is provided for adjusting the voltage developed across the resistance 105. The effect of the resistance 105 will be explained hereinafter.

For the purpose of controlling the conducting state of the device 89, suitable biasing means are provided for applying a controlled bias to the grid 95 of the device 89. Such biasing means is effective to apply a predetermined polarity of bias to the grid 95 for a given direction of power of the circuit 3. The biasing means is further effective to reverse the polarity of bias applied to the grid 95 in response to a reversal of the direction of power of the circuit 3 to thereby effect a corresponding reversal in the conducting state of the device 89.

As illustrated, the biasing means for the device 89 includes a pair of additional discharge devices 109 and 111. The devices 109 and 111 are preferably of identical construction with the device 109 having an anode 113, a cathode 115 and a grid electrode 117 and with the device 111 similarly having an anode 119, a cathode 121 and a grid electrode 123. As shown, the anode 113 of the device 109 is connected to the grid 95 of the device 89 through a conductor 125. A suitable resistance 127 is included in the conductor 125 to limit grid current which flows when the device 89 is conducting. The anode 119 of the device 111 is connected to the conductor 36. The cathodes 115 and 121 of the devices 109 and 111 are connected together as indicated by the connection 130.

In order to supply bias to the grid 95, a pair of resistors 131 and 133 are connected in series between the conductors 125 and 36. The paths for current flowing through the devices 109 and 111 are completed by a conductor 135 having one end connected between the cathodes 115 and 121 and the other end connected between the resistors 131 and 133 at the point 137. With this arrangement, when the device 109 is conducting, current flows from the anode 113 to the cathode 115 through the conductor 135 and the resistor 131 back to the anode 113. Such current flow produces a voltage drop across the resistor 131 which is applied to the grid 95 to bias the grid 95 negatively with respect to the cathode 93.

When the device 111 is conducting, current flows from the anode 119 to the cathode 121 through the conductor 135 and the resistor 133 back to the anode 119. This current flow produces a voltage drop across the resistor 133 which is applied to the grid 95 to bias the grid 95 positive with respect to the cathode 93. It is observed that the resistors 131 and 133 supply biasing voltages of opposite polarity to the grid 95 when the devices 109 and 111 are conducting.

In order to provide a biasing voltage for the grid 95 having a separate polarity for each direction of power of the circuit 3, additional biasing means are provided to bias the devices 109 and 111 such that a separate one of such devices is conducting for each direction of power of the circuit 3. The additional biasing means are also arranged in accordance with the invention to reverse the conducting states of the devices 109 and 111 in response to a reversal of the direction of power of the circuit 3.

To this end the additional biasing means are connected to apply voltages to the devices 109 and 111 which vary in accordance with voltage and current of the circuit 3 and which have a phase relationship varying in accordance with the phase relationship between such voltage and current. In the specific embodiment illustrated, voltages are applied to the anodes 113 and 119 of the devices 109 and 111 which vary in accordance with voltage of the circuit 3.

For this purpose the output voltage of the amplifier 13 is applied to the primary winding 139 of a transformer 141 from the secondary winding 33 of the transformer 35. The transformer 141 has a secondary winding 143 connected in the conductor 135 to apply the voltage thereacross between the anode 113 and the cathode 115 of the device 109 and between the cathode 121 and the anode 119 of the device 111. With this arrangement, voltages applied to the anodes 113 and 119 will have the same instantaneous polarity for a predetermined instantaneous polarity of voltage across the winding 143. Such applied voltages are also equal in magnitude. If the amplifier 13 is omitted the primary winding 139 of the transformer 141 may be connected directly to the conductors 5 and 7 of the circuit 3.

The grid electrodes 117 and 123 of the devices 109 and 111 are biased in accordance with current of the circuit 3. For this purpose, a grid circuit for the device 109 is provided which includes a resistance 145, a portion 147 of a secondary winding 149 of a transformer 151 and a conductor 153 connected to the cathode 115. In a similar manner, the grid circuit of the device 111 includes a resistor 155, the remaining portion 157 of the winding 149 and the conductor 153. The conductor 153 is shown connected to the midpoint of the winding 149 at the point 159 so that the voltages applied to the grids 117 and 123 through the transformer 151 will be substantially equal in magnitude. The resistors 145 and 155 are provided to limit the grid current of the devices 109 and 111 which flows when such devices are conducting.

The transformer 151 includes a primary winding 161 connected for energization from the winding 49 of the transformer 51 of the amplifier 15 in accordance with current of the circuit 3. For this purpose, the upper end of the winding 161 is connected to the upper end of the winding 49 and the lower end of the winding 161 is connected to the lower end of the winding 49. With such arrangement, voltages applied to the grids 117 and 123 will have opposing instantaneous polarities for a predetermined instantaneous polarity of voltage across the winding 49. If the amplifier 15 is omitted the primary winding 161 of the transformer 151 may be connected in one of the conductors 5 and 7 of the circuit 3.

The arrangement as described is effective to cause a separate one of the devices 109 and 111 to conduct for each direction of power of the circuit 3. Furthermore, such arrangement causes the phase relationship between the voltages supplied by the transformers 141 and 151 to vary in accordance with the phase relationship between the voltage and current of the circuit 3. Consequently, a reversal of the conducting states of the devices 109 and 111 will occur in response to a reversal of the direction of power of the circuit 3.

In order to cause the biasing voltages produced by the transformers 141 and 151 to have a quadrature phase relationship when the currents energizing the terminals 23 and 25 have a quadrature phase relationship, the primary winding 161 of the transformer 151 is connected for energization from the winding 49 through a suitable phase shifting circuit including a resistance 163, a capacitor 165 and an inductance 167. One side of the winding 161 is in the form of an arm 169 which is adjustable relative to the resistance 163 to permit variation of the energization of the winding 161. Operation of the measuring system will now be described.

Let it be assumed that the current and voltage of the circuit 3 have a zero phase displacement. Let it be further assumed that for a given half cycle of current and voltage of the circuit 3 that voltages induced in the windings 143 and 149 have polarities as shown in the drawing. Then for this condition, the anode 113 and the grid 117 of the device 109 are at a positive potential relative to the cathode 115 with the result that the device 109 is in a conducting state. At the same time, the anode 119 of the device 111 is at a positive potential relative to the cathode 121 but the grid 123 is at a negative potential with respect to the cathode 21 with the result that the device 111 is in a non-conducting state.

For the succeeding half cycle of voltage and current of the circuit 3, the polarities of the windings 143 and 149 are reversed from the polarities illustrated. For this condition then, both the anode 113 and the grid 117 are at a negative potential relative to the cathode 115 to provide a non-conducting condition of the device 109. Simultaneously, the grid 123 of the device 111 is at a positive potential relative to the cathode 121, but the anode 119 is at a negative potential relative to the cathode 121 resulting in a non-conducting condition of the device 111. Consequently, it is observed that for the assumed conditions, the device 109 is conducting during alternate half cycles of voltage and current of the circuit 3 while the device 111 is at all times in a non-conducting state.

When the device 109 is conducting, the resulting current flow produces a voltage drop across the resistance 131 which is applied to the grid 95 to bias the grid negatively relative to the cathode 93. Since the device 109 conducts during alternate half cycles, the voltage appearing across the resistance 131 is in the form of half-wave pulses. For the purpose of effectively smoothing the half-wave voltage pulses to apply a continuously negative bias to the grid 95 throughout each cycle of voltage and current of the circuit 3, a capacitor 171 is connected between the grid 95 and the conductor 36 in parallel with the resistors 131 and 133.

The negative bias applied to the grid 95 prevents conduction of the device 95 with the result that the winding 61 of the switch means 59 is deenergized as illustrated in the drawing. Deenergization of the winding 61 is effective to establish the first energizing path comprising conductors 41, 43, 45 and 47 to effect one instantaneous polarity of energization of the terminals 25. For this polarity, the instrument 17 is connected to provide an on-scale indication. For the condition presently under discussion, it will be recalled that power in the circuit 3 is assumed to have a positive direction.

Let it now be assumed that the phase displacement between the voltage and current of circuit 3 is progressively increased from 0° toward 90°. For this condition, the relative instantaneous polarities of the voltages applied to the devices 109 and 111 by the transformers 141 and 151 will vary in such a manner that the device 109 will conduct during a progressively decreasing portion of each alternate half cycle of voltage and current of the circuit 3. Also, for this condition, the device 111 will conduct during a progressively increasing portion of each alternate half cycle.

If the magnitudes of the resistors 131 and 133 are assumed equal, a negative bias is applied to the grid 95 which becomes progressively smaller in magnitude as the phase displacement approaches 90°. Consequently, for phase displacements between 0 and 90° the device 109 is effective to supply a negative bias to the grid 95 to maintain the device 89 in a non-conducting condition with the result that the switch means 59 is in a deenergized condition as illustrated in the drawing.

Let it be assumed now that the phase displacement between the voltage and current of the circuit 3 is equal to 90°. For this condition, the relative instantaneous polarities of the voltages applied to the devices 109 and 111 by the transformers 141 and 151 are such as to cause the device 109 to conduct for one half of each alternate half cycle of voltage and current of the circuit 3, and to cause the device 111 to conduct for the other half of each alternate half cycle. Such conducting sequence of the devices 109 and 111 causes the average bias voltage produced by the resistors 131 and 133 during a complete cycle to have a zero magnitude.

If the phase displacement between the voltage and current of the circuit 3 is increased slightly beyond 90°, the relative instantaneous polarities of the voltages applied to the devices 109 and 111 are such that the device 111 conducts during a slightly greater portion of each alternate half cycle than the portion during which the device 109 conducts. Consequently, the average voltage drop across the resistor 133 during a complete cycle is slightly greater than the average voltage drop across the resistor 131 during a complete cycle with the result that a small voltage is applied to the grid 95 to bias the grid 95 positive relative to the cathode 93.

This small positive bias is sufficient to initiate conduction of the device 89 to thereby energize the winding 61 for actuating the several contact bars from the positions shown in the drawing wherein one of the energizing paths is established to the other position wherein the other of the energizing paths is established. This is effective to cause a reversal of the instantaneous polarity of energization of the terminals 25 from the polarity existing when the first energizing path is established. Consequently, the instrument 17 continues to provide an on-scale indication for a phase displacement between voltage and current of the circuit 3 which is greater than 90° corresponding to a negative direction of power.

The resistor 105 is provided in the cathode circuit of the device 89 to develop a voltage acting in opposition to the voltage developed by the resistor 133 when the device 89 is in a conducting condition. The value of this voltage may be varied by adjustment of the arm 107 to provide a point of actuation of the switch means 59 which corresponds substantially to a 90° phase displacement between the voltage and current of circuit 3.

When conduction of the device 89 is initiated, the contact bar 68 is also actuated from the position shown to a position effective to establish the circuit represented by the conductor 90. This causes current to flow through the winding 61 from the conductor 99 to the conductor 36. Consequently, two energizing currents flow through winding 61 to assure continued energization of the winding 61 for a negative direction of power.

In accordance with a further aspect of the invention, the switch means 59 is effective to control the energization of additional indicating means to provide an indication of the direction of power of the circuit 3. Such additional indicating means may take any desired form and is conveniently positioned at a location remote from the instrument 17.

For this purpose the additional indicating means is illustrated in the form of an electrical indicating instrument 173 having a suitably calibrated scale 175 across which an indicating pointer 177 moves in response to energization of a pair of input terminals 179 and 181 of the instrument 173. The instrument 173 may be of any suitable type such as a direct current responsive instrument of the permanent magnet type.

In the specific embodiment shown the instrument 173 is connected for energization from a source 183 of direct current through a pair of energizing paths connected between the source 183 and the terminals 179 and 181. One of these paths includes a pair of conductors 185 and 187 and the other path includes conductors 189 and 191. As illustrated, the two energizing paths are connected to provide opposing polarities of energization of the terminals 179 and 181 relative to each other.

In order to control the establishment and interruption of the energizing paths to thereby control the polarity of energization of the instrument 173, the switch means 59 is provided with contact bars 73, 75, 77 and 79 each associated with a separate one of the conductors of the energizing paths. As illustrated, the path which includes the conductors 185 and 187 is in an established condition by reason of the contact bars 75 and 79 engaging terminals 193 and 195 of the conductors 185 and 187 respectively. The path including the conductors 189 and 191 is shown in an interrupted condition by reason of the disengagement of contact bars 73 and 77 relative to the terminals 197 and 199 of the conductors 189 and 191 respectively.

With the arrangement illustrated, current will flow from the source 183 through the contact bar 75 to the terminal 181, the terminal 179 and the contact bar 79 back to the source 183. For the deenergized position of the switch means 59 shown, it is recalled that power of the circuit 3 is assumed to have a positive direction. The scale 175 of the instrument 173 is conveniently calibrated with a center-zero marking to provide a positive power direction indication at one side of the zero marking and to provide a negative power direction indication at the other side of the zero marking. As illustrated in the drawing the pointer 177 is positioned at the center of the scale 175 at the zero marking to indicate a deenergized condition of the instrument 173.

It will be recalled that as the phase displacement between voltage and current of the circuit 3 changes from a condition less than 90° to a condition greater than 90° the switch means 59 is energized from the device 89 to actuate the several contact bars to positions opposite from those shown. Such energization of the switch means 59 is effective to simultaneously interrupt the energizing path including the conductors 185 and 187 and to establish the energizing path which includes the conductors 189 and 191. The polarity of energization of the terminals 179 and 181 is thereby reversed from the polarity of energization with the switch means 59 in the position illustrated. Such polarity reversal results in the pointer 177 assuming a position at the left of the zero marking to provide an indication of negative power direction.

Instead of the instrument 173 a suitable lighting arrangement may be employed to indicate the direction of power of the circuit 3. For example, a separate indicating lamp may be connected in each of the paths including conductors 185 and 187 and conductors 189 and 191 for energization from the source 183 under control of the switch means 59. With this arrangement a separate lamp would be illuminated for each direction of power of the circuit 3.

The system 1 may conveniently be modified to produce a response representative of the magnitude and direction of reactive power of the circuit 3. To this end it is merely required to change the phase displacement between the voltage and current quantities energizing the amplifiers 13 and 15 by 90°. This is conveniently accomplished by connecting a suitable phase shifting network between the amplifier 13 and the circuit 3 for energization from the circuit 3.

Although the invention has been described with reference to certain specific embodiments thereof, numerous modifications falling within the spirit and scope of the invention are possible.

We claim as our invention:

1. In an electrical measuring system responsive to alternating quantities having a phase relationship variable between a pair of phase conditions, an electrical instrument having a pair of input terminal means, circuit means for energizing said terminal means with energizing currents representative of said alternating quantities, said instrument producing when energized a response which is a product function of said alternating quantities, said instrument including a calibrated scale having an end zero marking, and an indicating pointer adapted to traverse said scale in response to energization of said terminal means to provide a visual indication of said response, said pointer tending to assume a first position on the scale side of said zero marking for one of said phase conditions, and a second position on the off scale side of said zero marking for the other of said phase conditions, said circuit means including a pair of paths for current energizing one of said terminal means, said paths providing opposing instantaneous polarities of energization of said one of said terminal means relative to each other, and control means for controlling the path of energization of said one of said terminal means to maintain the first position of said pointer for each of said phase conditions, said control means including switch means actuable from a first position effective to establish one of said paths to a second position effective to establish the other of said paths, a first electric discharge device having a first electrode for controlling said switch means in accordance with biasing of said first electrode, said first device being effective in response to variation of said biasing from a first bias condition to a second bias condition for actuating said switch means, and biasing means for biasing said first electrode, said biasing means including a pair of second electric discharge devices, each of said second devices being effective when conducting to provide a separate one of said bias conditions, and circuit means for biasing said second devices in accordance with said alternating quantities to render a separate one of said second devices conducting for each of said phase conditions.

2. In an electrical measuring system responsive to alternating quantities having a phase relationship variable between a pair of phase conditions, an electrical instrument having a pair of input terminal means, circuit means for energizing said terminal means with energizing currents representative of said alternating quantities, said instrument producing when energized a response which is a product function of said alternating quantities, said instrument including a calibrated scale having an end zero marking, and an indicating pointer adapted to traverse said scale in response to energization of said terminal means to provide a visual indication of said response, said pointer tending to assume a first position on the scale side of said zero marking for one of said phase conditions, and a second position on the off scale side of said zero marking for the other of said phase conditions, said circuit means including a pair of paths for current energizing one of said terminal means, said paths providing opposing instantaneous polarities of energization of said one of said terminal means relative to each other, and control means for controlling the path of energization of said one of said terminal means to maintain the first position of said pointer for each of said phase conditions, said control means including switch means actuable from a first position effective to establish one of said paths to a second position effective to establish the other of said paths, a first electric discharge device having a first electrode for controlling said switch means in accordance with biasing of said first electrode, said first device being effective in response to variation of said biasing from one polarity condition to the opposite polarity condition for actuating said switch means, a pair of second electric discharge devices each having an anode, cathode and control electrode, a pair of resistance means each connected between the anode and cathode of a separate one of said second devices, said resistance means being connected to apply first biasing potentials of opposing polarity to said first electrode in response to conduction of said second devices, first circuit means connected to apply second biasing potentials varying in accordance with one of said alternating quantities between the anodes and cathodes of said second devices with like instantaneous polarities, and second circuit means connected to apply third biasing potentials varying in accordance with the other of said alternating quantities between the third electrodes and cathodes of said second devices with opposing instantaneous polarities.

3. In a power measuring system responsive to alternating voltage and current quantities having a variable phase relationship, a wattmeter device having a pair of terminal means, circuit means connected to energize said terminal means with energizing currents representative of said alternating quantities, said wattmeter device producing when energized an indication which is a product function of said alternating quantities, said indication having a first direction for a first phase displacement between said alternating quantities less than ninety degrees, and a second direction for a second phase displacement between said alternating quantities greater than ninety degrees, said circuit means including a pair of paths for current energizing one of said terminal means, said paths providing opposing instantaneous polarities of energization of said one of said terminal means relative to each other, and control means for controlling the path of energization of said one of said terminal means to maintain the same direction of indication for each of said first and second phase displacements, said control means including switch means actuable from a first position effective to establish one of said paths to a second position effective to establish the other of said paths, a first electric discharge device having a first electrode for controlling said switch means in accordance with biasing of said first electrode, said first device being effective in response to variation of said biasing from a first bias condition to a second bias condition for actuating said switch means, and biasing means for biasing said first electrode, said biasing means including a pair of second electric discharge devices, each of said second devices being effective when conducting to provide a separate one of said bias conditions, and circuit means for biasing said second devices in accordance with said alternating quantities to render a separate one of said second devices conducting for each of said phase conditions.

4. In a power measuring system responsive to alternating voltage and current quantities having a variable phase relationship, a wattmeter device having a pair of terminal means, circuit means connected to energize said terminal means with energizing currents respresentative of said alternating quantities, said wattmeter device producing when energized an indication which is a product function of said alternating quantities, said indication having a first direction for a first phase displacement between said alternating quantities less than ninety degrees, and a second direction for a second phase displacement between said alternating quantities greater than ninety degrees, said circuit means including a pair of paths for current energizing one of said terminal means, said paths providing opposing instantaneous polarities of energization of said one of said terminal means relative to each other, and control means for controlling the path of energization of said one of said terminal means to maintain the same direction of indication for each of said first and second phase displacements, said control means including switch means actuable from a first position effective to establish one of said paths to a second position effective to establish the other of said paths, a first electric discharge device having a first electrode for controlling said switch means in accordance with biasing of said first electrode, said first device being effective in response to variation of said biasing from one polarity condition to the opposite polarity condition for actuating said switch means, a pair of second electric discharge devices each having an anode, cathode and control electrode, a pair of resistance means each connected between the anode and cathode of a separate one of said second devices, said resistance means being connected to apply first biasing potentials of opposing polarity to said first electrode in response to conduction of said second devices, first circuit means connected to apply second biasing potentials varying in accordance with one of said alternating quantities between the anodes and cathodes of said second devices with like instantaneous polarities, and second circuit means connected to apply third biasing potentials varying in accordance with the other of said alternating quantities between the third electrodes and cathodes of said second devices with opposing instantaneous polarities.

References Cited in the file of this patent

UNITED STATES PATENTS

| | | |
|---|---|---|
| 1,066,721 | Gale | July 8, 1913 |
| 1,984,545 | Peterson | Dec. 18, 1934 |
| 2,519,071 | Rowell | Aug. 5, 1950 |
| 2,589,721 | MacNaney | Mar. 18, 1952 |
| 2,601,354 | Wylie | June 24, 1952 |
| 2,661,457 | Boast et al. | Dec. 1, 1953 |